United States Patent

Mathewson, Jr. et al.

[15] 3,684,097

[45] Aug. 15, 1972

[54] BLOOD COMPONENT EXCHANGE DEVICE

[72] Inventors: Wilfred F. Mathewson, Jr., Schenectady; David M. Ryon, Scotia, both of N.Y.

[73] Assignee: General Electric Company

[22] Filed: July 2, 1970

[21] Appl. No.: 51,829

[52] U.S. Cl. .................................210/321, 23/258.5
[51] Int. Cl. ..............................................B01d 13/00
[58] Field of Search ................210/321, 541; 55/158; 23/258.5; 128/DIG. 3

[56] References Cited

UNITED STATES PATENTS

| | | | |
|---|---|---|---|
| 3,060,934 | 10/1962 | Claff et al. | 210/321 X |
| 3,398,091 | 8/1968 | Greatorex | 210/321 X |
| 3,488,690 | 1/1970 | Ross et al. | 210/321 |
| 3,412,865 | 11/1968 | Lontz et al. | 210/321 |
| 3,212,642 | 10/1965 | Kylstra | 210/321 |
| 3,256,174 | 6/1966 | Chen et al. | 210/321 X |
| 3,520,803 | 7/1971 | Iaconelli | 210/321 X |

OTHER PUBLICATIONS

The Membrane Lung: Studies with a New High Permeability Copolymer Membrane, Trans. Amer. Sos. Avl. Int. Org., Pierce et al., 1968 pp. 220-226

*Primary Examiner*—Reuben Friedman
*Assistant Examiner*—Richard Barnes
*Attorney*—Jon Carl Gealow, Joseph B. Forman, Arthur V. Puccini, Frank L. Neuhauser and Oscar B. Waddell

[57] ABSTRACT

A device for oxygenating or dialyzing blood has elementary units comprising pairs of frames having rectangular openings and a gas permeable membrane on each face. Two confronting membranes define a thin passageway for blood. Remote sides of the membranes confront a porous support structure in a second passageway in which another fluid such as dialysate or oxygen enriched gas flows. The second passageway contains a flat screen wrapped in a fibrous material which distributes the gas uniformly and supports the membranes when the space between them is pressurized with blood. The frames have apertures for conveying blood or other fluid to respectively alternate passageways. Thermoplastically formed protuberances project integrally from the membranes into the blood space for agitating the flowing blood film.

7 Claims, 6 Drawing Figures

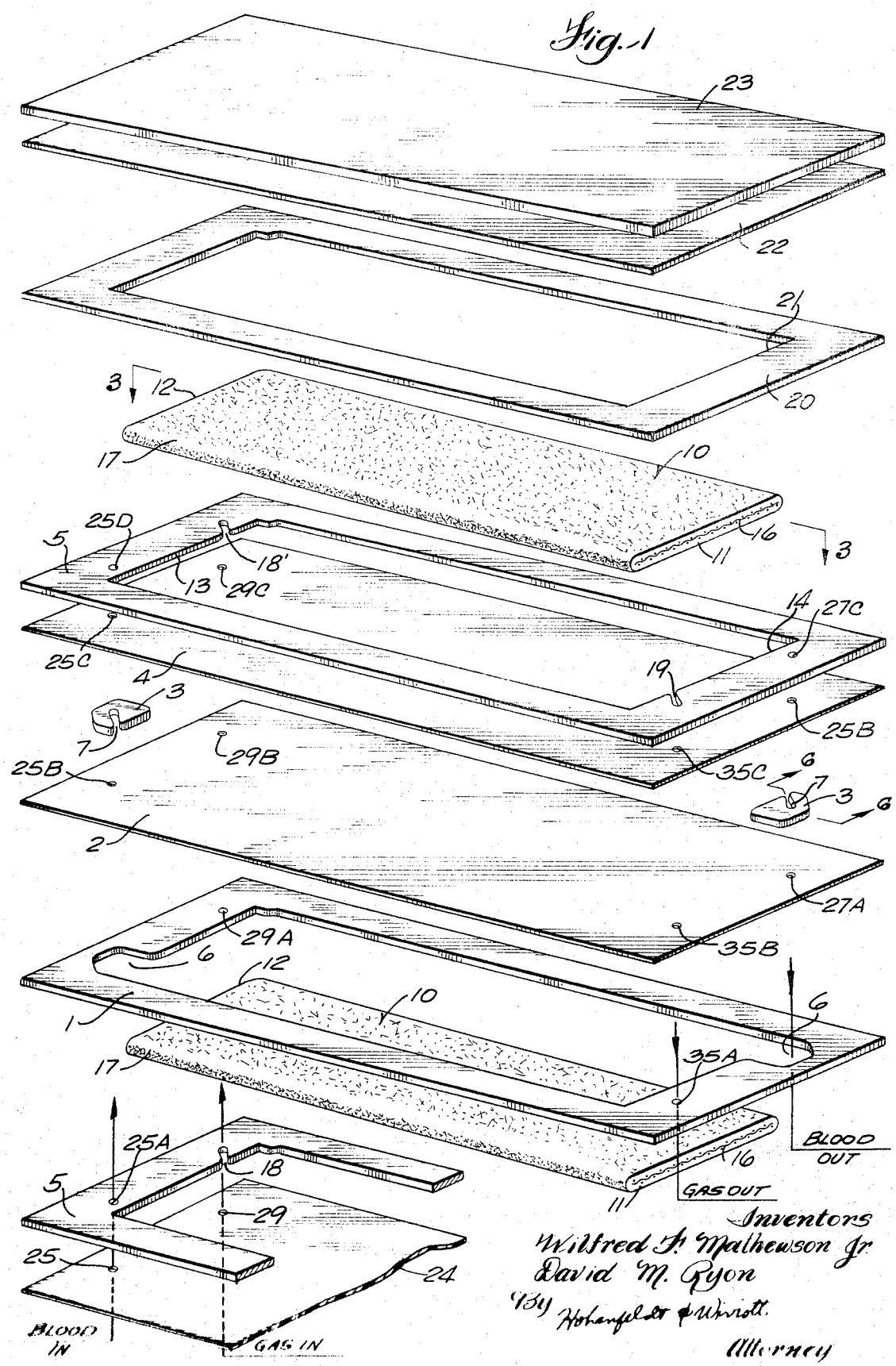

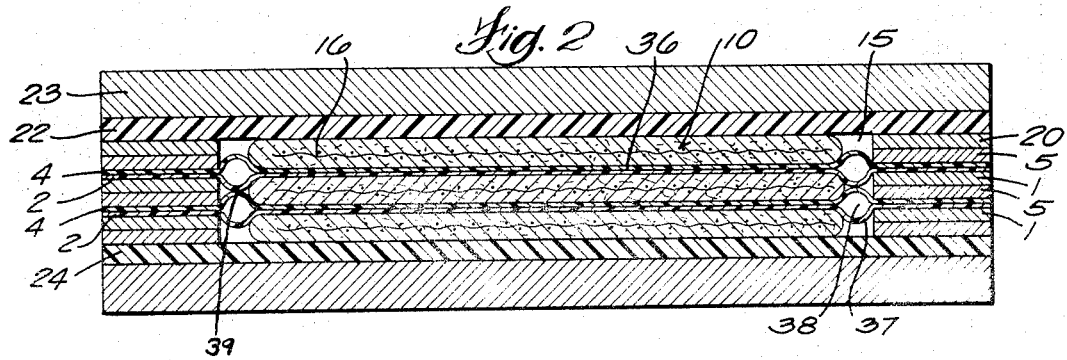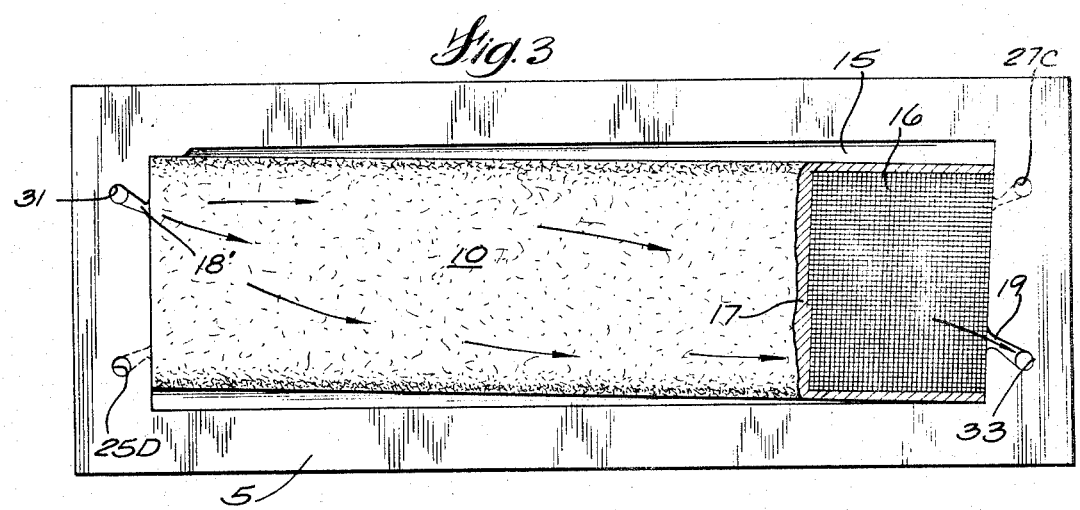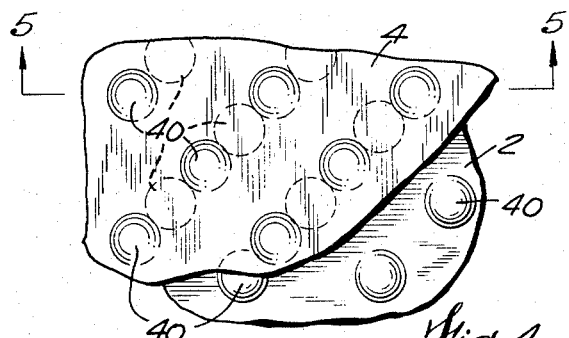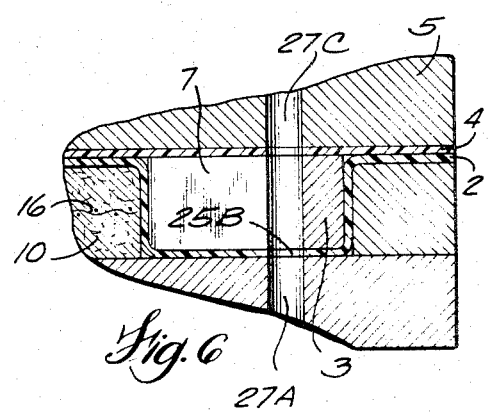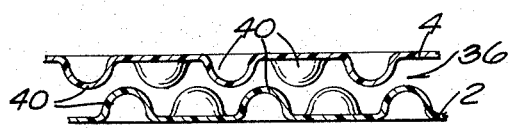

3,684,097

BLOOD COMPONENT EXCHANGE DEVICE

BACKGROUND OF THE INVENTION

The first generation of extracorporeal blood gas exchange devices distributed a thin film of blood over a large area in the presence of an oxygen rich ambient. The blood thereby yielded some of its carbon dioxide and became partially saturated with oxygen. This process caused undue hemolysis, clotting, protein denaturation and had other damaging effects on the blood. Blood trauma thus became a limiting factor in long term perfusion with blood that had been subjected to extracorporeal oxygenation.

The current trend in blood gas exchange devices is toward use of a membrane which has blood on one side and oxygen enriched gas on the other. This is more analogous to the phenomena in the natural lung where alveolar air and the capillary blood are separated by a thin membrane which allows efficient diffusion of oxygen into the blood and carbon dioxide out of it. The oxygen tension to which red blood cells are exposed is reduced by the presence of an artificial or natural membrance as compared with a direct contacting device. Hence, oxygenation involving a membrane results in less hemolysis of red blood cells and in less deformation and fracture of blood proteins. Protein damage is manifested by sludging and by fat aggregates or other emboli occurring in the blood vessels, sometimes with permanently injurious consequences.

Membrane-type blood gas diffusing devices developed up to this time exhibit reduced blood trauma and improved gas exchange efficiency compared with a film-type or bubble-type devices. The prior art membrane-types usually comprise stacked membrane envelopes with blood running on one side of the membrane and gas on the other side. Separators with intricate channels are used to simulate capillary flow and supposedly to minimize the formation of rivulets or preferential flow paths which militate against all of the blood in the device being in contact with the membrane surfaces. These prior devices have been unduly large for their gas exchange capacity. Their priming requirements are consequently high. The membranes used have been inclined to cohere at their interfaces during storage, requiring special treatment or an uncertain sacrifice of gas exchange area when put into use. The number of piece parts, the complexity and, hence, the number of manufacturing steps have been unduly high, leading to high cost and a severe economic disadvantage in the light of the device being intended for disposal after a single use. The ratio of blood holdup with respect to flow rate has been higher than desirable in past designs. Moreover, this holdup ratio has been observed to vary disadvantageously with change in flow rates and, in some cases, membranes have been known to puncture due to distension with increased blood pressures and due to high concentrated stresses that are developed on the intricate multiple point membrane separators or back-up members. The new membrane fluid exchange device to be described herein overcomes these and other disadvantages.

SUMMARY OF THE INVENTION

The present device is constructed primarily for use as an artificial lung, whereupon it supplants the carbon dioxide in blood with oxygen, or the device may be used as an artificial kidney, whereupon it transfers blood impurities to a dialysate. This description will focus on use of the device as an artificial lung for the sake of brevity.

The new device is distinguished by its simplicity and high gas exchange efficiency with low blood trauma. It is characterized by thin plastic frames each have a gas permeable membrane adhered to one of its faces. The frames are stacked in pairs with their membrane covered surfaces confronting each other to form a thin, large area path for a blood film to flow between them. The blood remote sides of the blood envelopes just described are recesses in an amount equal to the thickness of the frame. The recess constitutes a gas flow path. It is occupied by a thin, flat screen wrapped in a non-woven fibrous material which assists in obtaining uniform gas distribution over the back of the membrane, provides resilient back-up for the fragile membranes in the stack and has properties which promote blood coagulation so as to seal off blood flow if a pinhole leak develops in the membrane.

Objects of the new artificial membrane lung or oxygenator are to achieve a simple but effective construction; to minimize the quantity of priming fluid required; to reduce the likelihood of catastrophic membrane failure; to minimize the size of the oxygenator; to make it disposable by virtue of its low cost; to minimize blood film thickness and yet agitate the blood to optimize oxygen diffusion; to support the membranes somewhat elastically for yielding in a prescribed and desirable manner so that as blood flow is increased, blood pressure increases will be negated by increased membrane spacing; to minimize gas pressure drop; to eliminate preferential blood flow paths between membranes and from layer to layer; to minimize foreign surface areas that are in contact with blood; to eliminate sophisticated manifolding and sealing requirements, thereby reducing the probability of leaks; and, to seal off pinhole leaks, if any, in the membrane by clotting blood on a membrane face outside of the blood flow path.

How the foregoing and other specific objects are achieved will appear from time-to-time in the course of the ensuing description of an illustrative embodiment of the invention taken in conjunction with the drawings.

DESCRIPTION OF THE DRAWINGS

FIG. 1 is an exploded perspective view of the blood oxygenator assembly;

FIG. 2 is a vertical cross-section taken laterally through an assembly such as that of FIG. 1 when it is compacted;

FIG. 3 is a top view of a gas frame as viewed in the direction of the arrow 3—3 in FIG. 1, the fibrous material being partially broken away to show the screen;

FIG. 4 shows fragments of two confronting membranes to illustrate and magnify the myriad of protuberances on the membranes;

FIG. 5 is a vertical cross-sectional view of the confronting membranes taken on a line 5—5 of FIG. 4; and FIG. 6 is a fragmentary vertical section taken on the line 6—6 in FIG. 1 when the exploded view is compacted as during normal assembly.

DESCRIPTION OF A PREFERRED EMBODIMENT

The basic elements of a blood oxygenator of any desired capacity are called a blood envelope in reference to FIG. 1. A blood envelope comprises a clear polyvinyl or other plastic blood frame 1, a membrane 2, a blood distribution insert 3, another membrane 4 and a gas frame of clear polyvinyl or other suitable plastic 5.

In reference to FIG. 1, a thin gas permeable membrane 2 is fastened to the top surface of plastic blood frame 1 with a suitable adhesive or by heat bonding. Initially, when the membrane 2 is on the top face of the blood frame 1, there is a free space behind that area of the membrane which is over a distribution insert notch 6. However, when the assembly is stacked and compressed, a blood distribution insert 3 is pressed into notch 6 so that the membrane in that region is depressed flush with the bottom face of frame 1 as can be seen in FIG. 6. The blood distribution insert 3 has an elongated slot 7 which directs blood between the top of membrane 2 and the bottom of membrane 4 when the device is assembled.

A gas frame 5 is pre-assembled with a membrane 4 adhered to its bottom face. When the components are stacked and compressed, membrane 4 bears on membrane 2, but due to the elasticity of the membranes, a blood flow passageway or layer about 2 to 5 mils thick can be formed between the membranes.

Note that when frames 1 and 5 are stacked and compressed with membranes 4 and 2 confronting each other, no gasket frames are needed between the planar frames to make them gas and blood tight. An adhesive around the edges of the frames is all that is needed for these purposes. Blood distribution insert 3 is essentially the same thickness as frame 1 so that when the insert is pressed into notch 6, the two frames and membranes meet flatly over their confronting surfaces.

Oxygen is distributed over the blood remote sides of membranes 2 and 4 which means, in respect to FIG. 1, over the top of membrane 4 and the bottom of membrane 2. Considering membrane 4, one may see that its top surface is exposed in the rectangular opening of gas frame 5. The membrane 4 top surface and the opening in frame 5 thereby form a recess whose depth is essentially equal to the thickness of frame 5.

Disposed on top of membrane 4 in the rectangular recess is a gas distribution element 10. This element may be rectangular in shape or it may be a parallelogram whose ends 11 and 12 contact inside edges 13 and 14 of the rectangular recess in frame 5. Gas distribution element 10 has a width which is less than the width of the rectangular opening in frame 5 in order to allow a free space 15 which can be seen best in FIG. 2. This free space 15 allows the edges of the membranes inside of the frames to distend under the influence of blood pressure between confronting membranes and form a blood distribution channel 38 lengthwise of the gas frame as will be discussed in more detail later. The edge margin of one membrane may distend vertically in one direction by an amount that is sufficient to bring it into contact, or nearly so, with the edge margin of a membrane that is distended in the opposite direction so that the two confronting margins substantially occlude channel 15.

The gas distribution element 10 comprises a screen 16, which may be about thirty mils thick. Screen 16 is enclosed in a non-woven fibrous material 17 which is folded around the screen and has its joint heat sealed or otherwise adhered to form a snugly fitting sleeve around the screen. The non-woven material 17 preferably consists of Dacron fibers which are laid down as in the papermaking process. The fibers have a preferred orientation in one direction and the material has a high degree of porosity. One embodiment of the invention uses a non-woven material which is nominally 3 mils thick and is obtainable from Kendall Mfg. Co., Walpole, Massachusetts, as Webril type M-1434. The screen 16 is preferably plastic and may have a mesh of 24 × 28 strands per lineal inch.

Gas frames 5 have suitable inlet and outlet ports 18, 19 which direct the flow of gas laterally through distribution element 10, comprised of screen 16 and non-woven material, over the top or blood remote face of membrane 4 as may be seen in FIGS. 1 and 3. A rectangular spacer frame 20 may be stacked on top of the topmost gas frame 5. This spacer frame 20 is preferably of the same thickness and character as the gas and blood frames 1 and 4 and it also has a rectangular opening 21 into which the gas distribution element 10 extends. Except for rectangular opening 21, spacer frame 20 is otherwise imperforate.

Stacked on top of spacer frame 20 is a plain sheet 22 of any suitable metal or plastic material which acts as a barrier against gas flow out of the spacer frame 20.

An upper metal plate 23 acts as a stiffener or back-up member. This plate 23 is not actually a part of the oxygenator package but is a part of the mounting, now shown in FIG. 1, in which the assembly previously described is installed.

Below the lowermost gas frame 5 in FIG. 1 is another back-up sheet 24 of plastic or metal. It is the elements between and including top sheet 22 and bottom sheet 24 which constitutes the basic oxygenator package which is sold for use in the customer's mounting. Larger capacity oxygenators, of course, comprise additional membrane covered gas frames and blood frames which are stacked on the basic pair which have been described in reference to FIG. 1.

The various frames and membranes have suitable apertures which serve as blood and gas inlets and outlets. Blood, for instance, flows upwardly through hole 25 in bottom sheet 24 and through hole 25A in lower gas frame 5 after which it encounters hole 25 in membrane 2. It then flows between membranes 2 and 4 by exiting from slot 7 in gas distribution insert 3 which is depressed into the corner recess 6 of the first blood frame 1. Blood flows out of slot 7 over the top of membrane 2 and underneath confronting membrane 4 to the diagonally opposite corner of blood frame 1 where it flows downwardly and out again, starting at slot 7 in insert 3, after which it flows through aperture 27A in the membrane 2 and out through a corresponding aligned hole, not shown, in bottom sheet 24. Gas may flow along the blood remote surfaces of the membrane in the opposite or in the same direction as the blood flows.

Pure oxygen or oxygen enriched gas may enter through a hole 29 in bottom sheet 24 and then exit through a gas frame slot 18 into the rectangular opening in the lowermost gas frame 5 whereupon it distributes over the bottom surface of the membrane 2 through porous gas distribution element 10. The next stacked blood frame 1 is provided with a hole 29A which aligns with another hole 29B in membrane 2 for permitting gas flow upwardly to the next gas exit slot 18' in the next upward gas frame 5. Gas then flows uniformly over the top surface of membrane 4 through gas distribution element 10 whereupon it exits by means of slotted port 19 which is diagonally opposite from gas port 18' in frame 5. From slotted port 19 the gas descends through aligned holes 35C in membrane 4, 35B in membrane 2 and 35A in blood frame 1 whereupon it passes out of the assembly through a corresponding hole in lower sheet 24 and into an exhaust piping system, neither the hole nor piping being shown.

FIG. 2 is a vertical section taken laterally through an oxygenator package that comprises two blood envelopes instead of one as in FIG. 1. This is evidenced by the fact that there are two pairs of confronting membranes 2 and 4, adhered respectively to the top of blood frames 1 and the bottom of gas frames 5, which define between them a thin blood passageway 36. in this figure, it is more evident that membranes 2 and 4, for example, are not backed up over their entire area by gas distribution element 10, but that there is the lengthwise free space 15 near their margins. This results from the fact that the width of gas distribution element 10 is less than the width of the rectangular opening in either gas frame 5 or blood frame 1. Thus, because gas distribution element 10 does not back-up the membranes in their marginal regions 37, these regions distend into free space 15 when they are under blood pressure and form blood flow channels 38 which are coextensive with the length of the rectangular frame opening and the length of the gas distribution element 10. Blood thus has a low resistance channel as a flow path extending from slot 7 in distribution insert 3 to the remote end of the rectangular frames along the outside edges of the gas distribution element 10, but separated therefrom by the distended part of the membranes. This effects uniform distribution of blood over the entire area between the membranes 2 and 4. One may see in FIG. 3 that if gas distribution element 10 has a parallelogram shape, free space 15 will be triangular or tapered as viewed from the top so that the membranes 2 and 4 may assume the same shape where they distend as at 39 from bottom toward the top of the gas frame in FIG. 3. This tapered channel contributes further to uniform distribution of the blood film across the interface of the membranes.

Note in FIG. 2 that two pairs of membranes 2 and 4 are supported above and below over most of their area by gas distribution elements 10. These elements 10 and the membranes are sandwiched between an upper planar and imperforate rigid member 22 and a lower rigid member 24. The thickness and resiliency of the gas distribution elements 10 is, therefore, of critical importance. These elements must be of such thickness and resiliency as to properly support the membranes and prevent distension in an amount which would allow the blood film between the membranes 2 and 4 to become undesirably thick. A thin blood film results in more complete diffusion of oxygen into blood that is flowing between the membranes 2 and 4. On the other hand, if the gas distribution elements 10 do not have the proper resiliency or are too thick, undue compression will be developed on the membranes and pressure drop through the oxygenator will be excessive.

As mentioned earlier, existing membrane oxygenators use rigid spacers, which are substantially coextensive in area with that of the membranes, to maintain the separation between membranes and control the blood film thickness. These spacers or separators are usually embossed with capillary grooves that divide the blood film and were considered necessary to avoid having the blood follow preferential paths although it did so anyway in many designs.

A significant feature of the oxygenator design herein described is that blood does not flow preferentially between pairs of membranes in a layer nor between parallel layers in a stack despite the fact that the conventional separators have been eliminated. One would expect that when blood was forced into the lowermost membrane envelope that the membranes would expand and compress the gas distribution element 10, thereby occluding blood flow between membranes in other envelope layers. But preferential flow does not occur because pressure drop across the interface of the confronting membranes is small compared with the pressure drops in the inlet and outlet blood distribution inserts 3. Since these inserts have uniform geometry, they define uniform flow slots and thus provide a constant pressure drop regardless of their level in the parallel stack. The result is that blood flow tends to be equal throughout a stack of membrane pairs of envelopes.

Another way of looking at it is that viscous pressure drop between membranes is small in this construction compared with the momentum pressure drop which results from changing the direction of the blood flow as it turns from a vertical direction to a horizontal direction in the inserts. This dynamic pressure change is sufficient at the lowermost level to force the blood upwardly to the next stack where the same condition occurs. Thus, all membrane pairs initially open equally and maintain equal and uniform blood film thickness during continuous operation of the oxygenator. The cost advantages, simplicity of construction and better operation resulting from eliminating the separators should be evident.

The thickness and mesh size of screen 16 which forms the core of the blood distribution element 10 is of importance. If the mesh openings are too great, the non-woven material 17 covering the screen will be forced into the mesh holes as will the membrane when the latter is subjected to blood pressure. This excessive distortion of the non-woven material would occlude the interstices of the screen and impair the lateral flow of oxygen across the distributiom element 10. By impairment is meant that dynamic resistance to gas flow is increased which requires that gas pressure be increased. This is contrary to an objective of the design which is to maintain low gas pressure as compared with the blood pressure so that if a membrane ruptures, free gas bubbles will not be introduced into the blood. Gas bubbles could be fatal to a patient who is undergoing extracoporeal blood oxygenation.

Because the gas permeable membranes such as 2 and 4 are about 2 mils in thickness, there is always some probability of a pinhole leak occurring in the membranes. It is an important feature of this invention that the gas distribution elements 10 be covered with a non-woven material which has thrombogenic or blood clotting properties. Experience with the new oxygenator has demonstrated that blood flowing from a pinhole leak in the membrane will quickly clot as it contacts the non-woven material 17 which is backing up the membrane. A pinhole leak is thus effectively sealed off without significant loss of blood and without free gas being introduced into the blood.

As implied above, it is known that diffusion of oxygen into blood is most complete when the blood film is thin and when the film is flowing turbulently or under slight agitation. In prior art oxygenators, this turbulence is obtained by backing up the membranes with rigid separators that are embossed with a myriad of small cones which divide the blood film into a multitude of paths. Unfortunately, with small cones or blunted points supporting the membrane, there can be no gas interchange with blood at the point of support because there is blood on one side of the membrane but no exposure to oxygen on the other side wherever a point bears on the membrane. Moreover, as a result of this construction in prior art devices, the confronting faces of the membranes are inclined to cohere during storage or before the oxygenator is used, in which case, blood flow between the membranes may be directed in preferential paths or be severely restricted. This reduces the gas transfer area undesirably.

The problems of gas interchange area reduction and membrane cohesion are overcome in the present invention by forming a myriad of protuberances 40 directly in the surface of each membrane as shown in FIGS. 4 and 5. The protuberances cause gentle agitation and laminar mixing to break up the boundary layer which exists at the boundary surface and thus enhance diffusion of oxygen into the blood. The protuberances 40 are formed by placing the membrane sheets on a die that has a myriad of corresponding recesses into which the membrane is drawn by a vacuum. During this drawing process, the membrane is heated and, since it is a thermoplastic material, it maintains its shape when it is cooled so the protuberances 40 remain. In essence, the membrane surface undergoes bending and stretching in the region of each protuberance which means that the membrane is thinner in these regions than elsewhere. Thus, the membrane transfers gas more efficiently through the thin protuberances. In prior art oxygenators, on the other hand, which have solid cones or protuberances cast on the membrane surface or have the protuberances formed when in use by backing up the membrane with a separator that has the small cones on it, the effect is to thicken the membrane or block it off at the points of support so as to reduce the capability of the membrane for transferring gas in the region of the protuberances. The protuberances of one membrane are interdigitated with those of a confronting membrane as in FIG. 5. This prevents membrane cohesion during storage.

It was implied earlier that the dimensions of the components of this oxygenator are not arbitrary. For instance, the combined thickness of blood frames 1 and gas frames 5 must be properly related to the thickness of the gas distribution element 10. As the combined thickness of the frames is increased, the thickness of the gas distribution element must be increased proportionately to maintain the proper blood film thickness for proper oxygenation. If gas distribution element 10 is too thick or not properly resilient, the blood film between membranes may be too thin and the flow resistance of both blood and oxygen may be unduly high.

The thickness range for both the blood frames 1 and the gas frames 5 has been determined to be from 10 to 30 mils, with about 20 mils being preferred. In a commercial design, the external dimensions of the rectangular frames are 8 by 24 inches and the window or frame opening is about 6 by 21 inches. One should observe, particularly in FIG. 2, that if the frames 1 and 5 are too thick, the membranes 2 and 4 may distend too much where it forms the blood channels 38 in which case, the probability of membrane rupture in the unsupported area may be increased.

The characteristics of the components of the blood distribution element 10 are also important. For the range of frame thicknesses mentioned in the last paragraph, the screen 16 should preferably fall within the thickness range of from 25 to 35 mils with 30 mils being preferred when the blood and gas frames are 20 mils thick. The thickness range for the non-woven fibrous material which wraps around screen 16 may be in the range of 2 to 10 mils, with 3 mils being preferred for the above given preferred frame thickness. As stated, the non-woven material 17 is preferably Dacron but other porous materials may be substituted. Materials comprised of fine filaments promote coagulation of blood by spreading it over a large surface area in a thin film. Localized coagulation on the material seals off pinhole leaks if there are any in the membrane.

An ideal material for the membranes is an organopoly-siloxane-polycarbonate block copolymer whose composition is described in U.S. Pat. No. 3,189,622 which is assigned to General Electric Company, the assignee of this application. A membrane of this type is designated by that company as MEM–213. A membrane made of this material has a high transfer coefficient for carbon dioxide and removes carbon dioxide approximately at the rate of 80 percent of the rate of oxygen addition which approximates the rate of gas transfer in the human lung. Its transfer coefficient for oxygen is also comparatively high. A membrane made of the above-mentioned material also has the desirable property of not tearing catastrophically when it is punctured as do some of the weaker silicone membranes which have been used in blood oxygenators.

The components of the blood oxygenator which lie below top plate 23 in FIG. 1 are assembled in the factory as a package which can be installed in an appropriate receptacle which clamps the package to preclude blood and gas leaks and which provides oxygen and blood inlet and outlet connections, not shown. A single envelope package such as shown in FIG. 1, is less than 100 mils thick when stacked and compressed. Using the dimensions given above, an oxygenator of this type provides enough gas exchange area for localized perfusion of an organ. By stacking more and more of the membrane frames, blood handling capacity can be attained for perfusing the whole body of an infant or an adult without fear of building up such internal pressure as to cause rupture of the membrane. This results from the fact that all membranes 2 and 4 are adequately supported by the gas distribution elements 10 on both sides. Blood pressure and gas pressure drops in the oxygenator are acceptably low. A summary of typical performance characteristics of the new oxygenator are set forth below in Table I.

TABLE I

| Number of membrane envelopes | Design blood flow rate (ml/min) | $O_2$ transfer at design blood flow rate (ml $O_2$/min) | Blood priming volume (ml) | perfusion pressure at design flow rate (mm Hg) |
| --- | --- | --- | --- | --- |
| 1 | 100 | 8 | 35 | 130 |
| 4 | 500 | 25 | 110 | 130 |
| 8 | 1000 | 50 | 200 | 130 |
| 16 | 2000 | 100 | 370 | 130 |

Although the various components of the new blood gas oxygenator have been described in considerable detail, it is to be understood that such description is intended to be illustrative rather than limiting, for the invention may be variously modified and is to be limited in scope only by interpretation of the claims which follow.

What is claimed is:

1. A membrane type blood component transfer device comprising:
   a. a pair of substantially planar frames having open central areas,
   b. thin membranes adhered respectively to the one surface of one frame and to the opposite surface of the other, said frames being stacked on each other with their membranes confronting each other and in substantial contact to define a thin blood film flow space between them,
   c. the surface of a membrane which is remote from the blood film flow space and the central opening of the frame to which said membrane is adhered defining a gas flow recess,
   d. the said one frame having in the margin of its central opening oppositely located blood inlet and outlet ports for directing blood flow between the confronting membranes,
   e. the said other frame having in the margin of its central opening oppositely located fluid inlet and outlet ports for directing a fluid other than blood across said recess in contact with said blood remote surface of the membrane,
   f. a planar member superposed over said recess to enclose it,
   g. a fluid distribution element disposed on the blood remote surface of the membrane in said recess, said element being substantially flat, resilient and porous,
   h. said element being substantially coextensive with one dimension of said frame opening and less than the other dimension so as to leave narrow free spaces between the opposite margins of the opening and the element, said free spaces being equal substantially in length to the said one dimension, whereby said membranes can distend within limits into said free space to effect elongated blood channels near the edges of the membranes when the space between them is under blood pressure.

2. The device set forth in claim 1 wherein said fluid distribution element comprises:
   a. a substantially planar screen, and
   b. a thin layer of porous fibrous material surrounding said screen.

3. The device set forth in claim 1 wherein said fluid distribution element is characterized by having a parallelogram shape, whereupon said free spaces have a substantially triangular shape.

4. A membrane type blood component transfer device comprising:
   a. a pair of substantially planar frames having open central areas,
   b. thin membranes adhered respectively to the one surface of one frame and to the opposite surface of the other, said frames being stacked on each other with their membranes confronting each other and in substantial contact to define a thin blood film flow space between them,
   c. the surface of a membrane which is remote from the blood film flow space and the central opening of the frame to which said membrane is adhered defining a gas flow recess,
   d. the said one frame having in the margin of its central opening oppositely located blood inlet and outlet ports for directing blood flow between the confronting membranes,
   e. the said other frame having in the margin of its central opening oppositely located fluid inlet and outlet ports for directing a fluid other than blood across said recess in contact with said blood remote surface of the membrane,
   f. one of said planar frames having a notch in one of its edges extending into said frame opening, said notch being overlayed by a membrane,
   g. a blood distribution insert having a blood flow slot, said insert having a thickness substantially equal to the frame thickness and a shape similar to the notch, whereby the insert is pressed into the notch to depress the membrane for facilitating blood flow between the insert slot and the blood film space between the confronting membranes.

5. A membrane type blood gas exchange device comprising:
   a. respective pairs of thin planar substantially rectangular blood and gas frames each of which has a substantially rectangular central opening enclosed by the frame margins,
   b. a thin blood gas permeable membrane adhered to a surface of each respective frame, said frame pairs forming a blood envelope by being superposed on each other so that their membranes confront each other and create a blood film passageway at their interface, the blood remote surfaces of said membranes constituting the bottom of a gas flow recess whose depth is equal to the frame thickness,
   c. said gas frames having at least a pair of gas port notches communicating with said gas flow recess and at least a pair of blood flow holes extending through them,
   d. said blood frames having at least a pair of blood port notches communicating with the blood film passageway at the membrane interface and at least a pair of gas flow holes,
   e. said membranes all being perforated in line with said holes and notches, and said frames being stacked so that blood holes align with blood notches and gas holes align with gas notches, whereby to admit and exit blood and gas respectively in the space between the membranes and on the blood remote surface of the membranes, f. an imperforate planar member on one end of the stacked frames for enclosing said gas recess, and g. a planar member at the other end of the stacked frames, the member having blood and gas inlet and outlet holes aligned with the corresponding aforementioned holes in the frames, h. a gas distribution element disposed on the blood remote side of each membrane in the aforesaid recess, said element being substantially flat, resilient and porous, i. said element being substantially coextensive with one dimension of said frame opening and less than the other dimension so as to leave narrow free spaces between the opposite margins of the opening and the element, said free spaces being equal substantially in length to the said one dimension, whereby said membranes can distend with limits into said free space to effect elongated blood channels near the edges of the membranes when the space between them is under blood pressure.

6. A membrane type blood gas exchange device comprising:

a. respective pairs of thin planar substantially rectangular blood and gas frames each of which has a substantially rectangular central opening enclosed by the frame margins, b. a thin blood gas permeable membrane adhered to a surface of each respective frame, said frame pairs forming a blood envelope by being superposed on each other so that their membranes confront each other and create a blood film passageway at their interface, the blood remote surfaces of said membranes constituting the bottom of a gas flow recess whose depth is equal to the frame thickness, c. said gas frames having at least a pair of gas port notches communicating with said gas flow recess and at least a pair of blood flow holes extending through them, d. said blood frames having at least a pair of blood port notches communicating with the blood film passageway at the membrane interface and at least a pair of gas flow holes, e. said membranes all being perforated in line with said holes and notches, and said frames being stacked so that blood holes align with blood notches and gas holes align with gas notches, whereby to admit and exit blood and gas respectively in the space between the membranes and on the blood remote surface of the membranes, f. an imperforate planar member on one end of the stacked frames for enclosing said gas recess, and g. a planar member at the other end of the stacked frames, the member having blood and gas inlet and outlet holes aligned with the corresponding aforementioned holes in the frames, h. said blood port notches being overlayed by membranes, i. a blood distribution insert having a laterally directed blood flow slot, said insert having a thickness substantially equal to the blood frames and being shaped to register with blood port notches, whereby the insert is pressed into the notches to depress the membrane for facilitating blood flow between the inserts slots and the blood film space between the membranes.

7. The device set forth in claim 5 wherein said gas distribution element comprises:

a. a substantially planar screen, and b. a thin layer of porous fibrous material surrounding said screen.

* * * * *